United States Patent [19]
Lehfeldt et al.

[11] Patent Number: 5,544,315
[45] Date of Patent: Aug. 6, 1996

[54] NETWORK MULTIMEDIA INTERFACE

[75] Inventors: Carl R. Lehfeldt, Morgan Hill; Leonard P. Cygnapowicz, San Jose, both of Calif.

[73] Assignee: Communication Broadband Multimedia, Inc., San Francisco, Calif.

[21] Appl. No.: 59,836

[22] Filed: May 10, 1993

[51] Int. Cl.[6] .............................. G06F 7/00; G06F 7/10; G06F 15/16
[52] U.S. Cl. ........................... 395/200.2; 395/200.01; 395/308; 348/465; 348/467; 348/552; 340/825.25; 340/286.02; 364/228; 364/222.2; 364/232.4; 364/242.94
[58] Field of Search ........................ 395/200, 325, 395/275, 325, 200.1, 200.2, 308; 379/90; 348/465, 467, 552

[56] References Cited

U.S. PATENT DOCUMENTS

| | | | |
|---|---|---|---|
| 5,159,665 | 10/1992 | Priem et al. | 395/134 |
| 5,177,737 | 1/1993 | Daudelin et al. | 370/67 |
| 5,179,667 | 1/1993 | Iyer | 395/275 |
| 5,187,779 | 2/1993 | Jeddeloh et al. | 395/325 |
| 5,191,657 | 3/1993 | Ludwig et al. | 395/325 |
| 5,241,631 | 8/1993 | Smith et al. | 395/325 |
| 5,247,516 | 9/1993 | Bernstein et al. | 370/82 |
| 5,263,139 | 11/1993 | Testa et al. | 395/325 |
| 5,325,423 | 6/1994 | Lewis | 379/90 |
| 5,339,395 | 8/1994 | Pickett et al. | 395/325 |
| 5,359,367 | 10/1994 | Stockill | 348/552 |

OTHER PUBLICATIONS

CCITT Study Group XVIII • Report R 34.

*Primary Examiner*—Thomas C. Lee
*Assistant Examiner*—Rehana Perveen Krick
*Attorney, Agent, or Firm*—Michael J. Hughes

[57] ABSTRACT

A multimedia network system (10) for connection to a computer (12) and a computer network (28). Asynchronous transmission mode cells on the network (28) are processed by a network interface board (22) with synchronous signals routed to an ISOBUS (26) and asynchronous signals routed through a packet memory (54) to the computer (12). Asynchronous signals are routed through the ISOBUS (26) to a video board (24) and converted for output to one or more audio/video output devices (36). Signals originating at one or more audio/video input devices (34) are processed through the video board (24) and the network interface board (22) to the network (28).

13 Claims, 6 Drawing Sheets

NETWORK MULTIMEDIA INTERFACE

TECHNICAL FIELD

The present invention relates generally to the field of electronic data communication and more particularly to a system for local and wide area transmission of video and text information. The predominant current usage of the multimedia network system is as a means for the exchange of information between a great variety of types of computerized devices such that information exchange is not limited by the type of computerized sending device or receiving device, nor by the nature of format of the digitized information to be exchanged.

BACKGROUND ART

The advent of the "information age" and the accompanying proliferation of computerized devices for generating and using digitized information has resulted a number of different machines and methods for the sharing of such information between users of such devices. This digitized information takes many different forms, including but not limited to digitized voice and other sound, digitized pictures (both moving and still) and data in many different formats. Given the great variety of types of digital data being generated, it is not surprising that quite a few methods for sharing such data have been devised, it being quite natural that different types of data might optimally be transmitted by different means. The most obvious, although certainly not the only, differences between the transmission requirements of disparate data types are the relative complexity of the data and the rapidity with which a quantity of data must be transmitted. Simple data transmission may be accomplished at relatively low rates while, at the other end of the spectrum, digital moving pictures require a wide bandwidth and high transmission frequency to update an image sufficiently quickly (even with the use of sophisticated data compression techniques).

In fulfillment of these various needs, local area network systems ("LANs") of various types have been developed for communication over short distances, and a further variety of wide area network systems ("WANs"), such as ARPANET, INTERNET, and USENET, have been developed for communication over longer distances. Fiber optic transmission systems, such as the Fiber Distributed Data Interface ("FDDI") and Distributed Queue Dual Bus ("DQDB") have been developed more recently. Even networks that operate at gigabit (billion bits per second) speeds and which consist of parallel connections between computers, such as a network marketed by Ultra Network Technologies, are available for linking supercomputers. At the present time, special networks have also been implemented for different services such as voice, data and video. While some of these networks have been adaptable to more than one data format, each has been restricted to only a limited spectrum of data types and the various networks in common usage are generally mutually incompatible.

While many single purpose data transmission means and methods were well adapted for their intended purpose, it became evident some time ago that it would be desirable to transmit more than one type of data by the same means. One of the first instances of this occurred in LAN type settings wherein it was found to be desirable to be able to transmit both voice and data over the same switched communications lines. In response to the need to communicate a variety of types of digital information, Integrated Services Digital Networks ("ISDN") have been developed for communicating integrated voice and data messages. However, early versions of ISDN methods have been limited in bandwidth such that moving pictures and other such time compacted information are not amendable to transmission thereby. A standard for a Broadband Integrated Services Digital Network ("BISDN") which will have the necessary transmission capabilities is being considered, and the International Telegraph and Telephone Consultive Committee ("CCITT") has published a Study Group XVIII Report R 34 with recommendations concerning BISDN. Asynchronous Transfer Mode ("ATM") is the transfer mode for implementing BISDN, and ATM is independent of the physical means of transport of BISDN signaling. The essence of BISDN is versatility, and so the proposals for its implementation leave it up to independent inventors to devise means for implementing communications in accordance with the proposed functional criteria. According to paragraph 2.3 of the above mentioned CCITT report, "The BISDN architecture is detailed in functional terms and is, therefore, technology and implementation independent".

Clearly, it would be advantageous to create a "technology and implementation" which would implement digital communications according to the BISDN defined functions. In some small degree, such means are indirectly assumed by the defined application. By specific intent, the detailed nature of such means is not defined by the functions themselves. Indeed, it is contemplated that a variety of such means may be developed to accomplish various aspects of the defined functions. While it may be relatively easy to implement specific functions of BISDN, prior to the present invention a means for more general implementation of these functions has not been defined. Furthermore, while it might be a more straightforward (although still quite complicated) engineering task to bring about universal implementation of BISDN functions through the use of very expensive high speed computers which could provide the necessary processing power to handle several broad bandwidth signals in parallel, prior to the present invention there has been no general means of implementation of BISDN which could be accomplished using commonly available and relatively inexpensive small computing devices such as personal computers and the like.

To the inventors' knowledge, no means for implementing the range of BISDN functional capabilities has been developed. All concepts for such means which have been advanced have been either limited in functional capability or else have been too expensive to implement for broad based consumer level acceptance.

DISCLOSURE OF INVENTION

Accordingly, it is an object of the present invention to provide means for communicating digitized information which is relatively independent of the form or content of such information.

It is another object of the present invention to provide a means for communicating a variety of types of digitized information which means is compatible with many existing data communications means and methods.

It is still another object of the present invention to provide a means for communicating digital information which can transmit and receive communications having text, graphics, data, image and moving picture information therein in combination.

It is yet another object of the present invention to provide a means for communicating digital information which is adaptable for use with commonly available computers.

It is still another object of the present invention to provide a means for communicating digital information which is inexpensive to produce.

It is yet another object of the present invention to provide a means for communicating digital information which is adaptable to essentially any function contemplated by proposed BISDN functional criteria.

Briefly, the preferred embodiment of the present invention is a multimedia network system having a plurality of interface units communicating with each other, with user computer input and output devices, and with the network through three distinct physical channels. Communication with the network is through a Synchronous Optical Network ("SONET") Interface. Communication with a host computer/controller is through a host bus interface, and communications with other interface units is through a unique Iso-Channel Bus ("ISOBUS"). In addition, communication with input and output devices may be made directly to the interface units thus, avoiding the necessity of requiring such communications to be directed through a host computer/controller. In the best presently known embodiment of the invention, a network card communicates directly with the network and a video card communicates with video and audio input and output devices. Both the network card and the video card communicate with and are controlled by the host computer/controller through the host bus interface, and communication between the video card and the network card is via the ISOBUS.

An advantage of the present invention is that a great variety of types of digital information may be communicated thereby.

A further advantage of the present invention is that it may be used in conjunction with commonly available personal computers and other inexpensive computer devices.

Yet another advantage of the present invention is that existing data communications means and methods may be integrated to communicate through a single data terminal.

Still another advantage of the present invention is that it is inherently relatively inexpensive to produce.

Yet another advantage of the present invention is that it uses inexpensive peripheral devices.

Still another advantage of the present invention is that the universality of application will improve economies of scale, thus further reducing cost to the consumer.

Yet another advantage of the present invention is that it can provide high quality moving picture video communications while also communicating voice and/or other data.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

The best presently known mode for carrying out the invention is multimedia network system for interfacing a BISDN network to a network terminal. The predominant expected usage of the inventive multimedia network system is in the data processing and communications industry, particularly in end user terminals wherein the ability to process a digital information in a great variety of formats is desirable.

Figure 1:
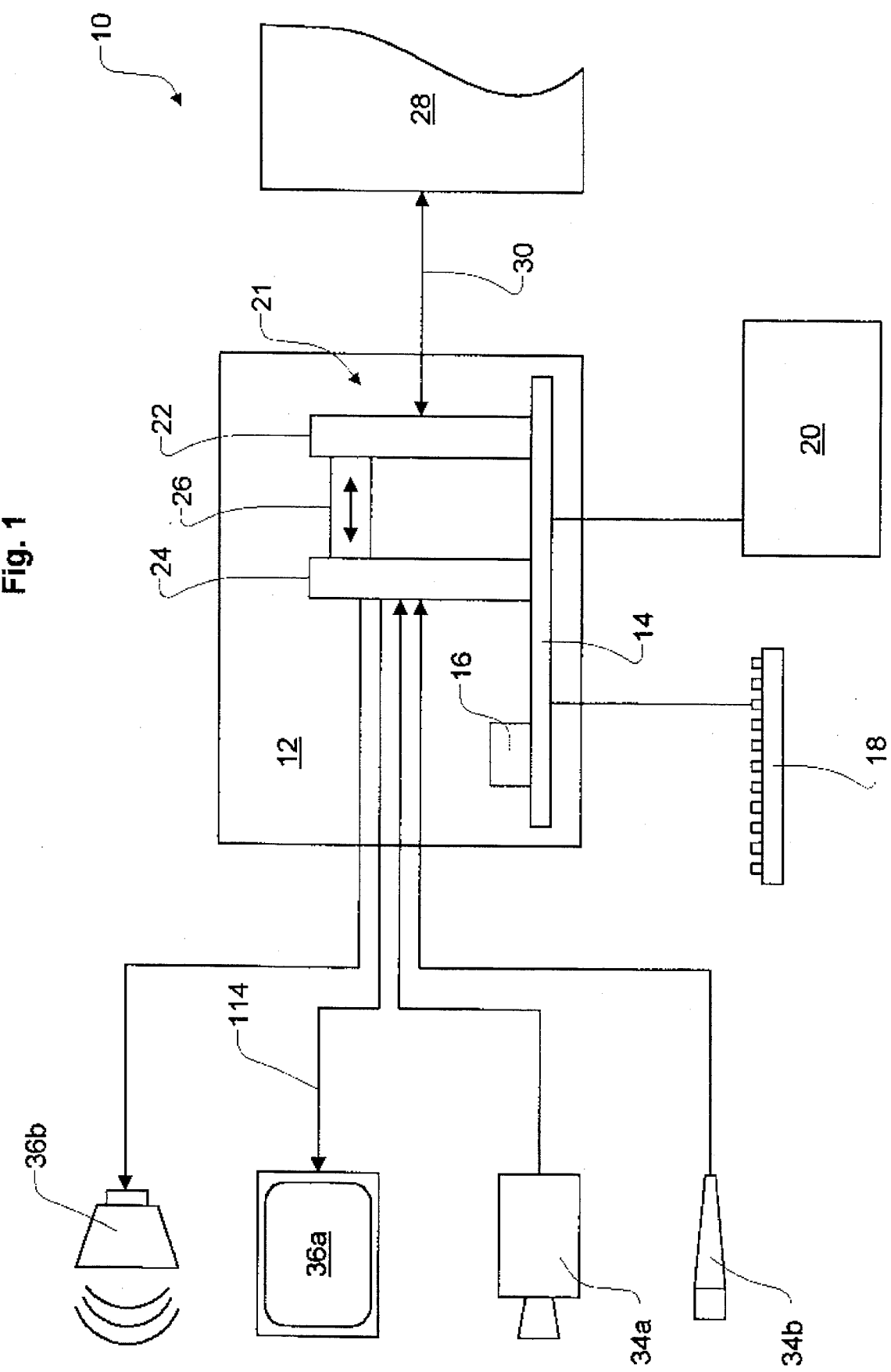
FIG. 1 is a block diagram of a multimedia network system according to the present invention.

The multimedia network system of the presently preferred embodiment of the present invention is illustrated in a block diagram in FIG. 1 and is designated therein by the general reference character 10. The multimedia network system 10 has a computer 12 with a computer bus 14 therein. As will be discussed in more detail hereinafter, it is intended that the inventive multimedia network system 10 be adapted for usage with a variety of computers 12 and computer buses 14. By way of example, in the best presently known embodiment 10 of the present invention, the computer bus 14 is a microchannel bus. As will be evident to one skilled in the art, the computer 12 has a central processing unit ("CPU") 16 connected to the computer bus 14 for processing data provided from the computer bus 14 and returning processed data to the computer bus 14. Other conventional peripheral devices in the best presently known embodiment 10 of the present invention include a keyboard and a printer 20 for input and output, respectively, of data to and from the computer 12. Additional data input and output means such as scanners, pen type input devices, and the like (not shown) may also optionally be provided as required by the application.

At the heart of the best presently known embodiment 10 of the present invention is a network interface subsystem 21 having a network interface board 22 and a video board 24. As can be seen in the view of FIG. 1, the network interface board 22 and the video board 24 are each connected directly to the computer bus 14. The video board 24 and the network interface board 22 are further connected to each other through an ISOBUS 26. The ISOBUS 26 is a slotted time domain multiplexed data bus for transport of constant bit rate services (such as ATM). In the best presently known embodiment 10 of the present invention, the ISOBUS 26 is a 16 bit wide bus operating at a basic clock rate of 38.88 MHz. Transmission on the ISOBUS 26 is time divided into 8848 slots (plus a spare 11 clocks between frames). The signals on the ISOBUS 26 are the 16 data lines, the 38.88 MHz clock, a frame clock, and a payload signal. For the sake of versatility in application, in the best presently known embodiment 10 of the present invention it is required that any device connected to the ISOBUS 26 (the network interface board 22 and the video board 24 in the example of FIG. 1) be capable of providing the clock signals, however only one is chosen to do so at any given time. The payload signal is driven by whichever device is assigned the transmit function.

The network interface board 22 is connected to a BISDN network through one or more network interface connections 30. In the best presently known embodiment 10 of the present invention, the network interface connection 30 is a fiber optic cable, although it is envisioned that other physical carriers having sufficient bandwidth might be employed for this purpose in the future.

Optionally connected to the video board 24 are a plurality of audio/video input devices 34 and/or an additional plurality of audio/video output devices 36. As can be seen in the view of FIG. 1, the best presently known embodiment 10 of the present invention has a video camera 34a and a microphone 34b as audio/video input devices 34, and a video monitor 36a and a speaker 36b as audio/video output devices 36.

Figure 2:
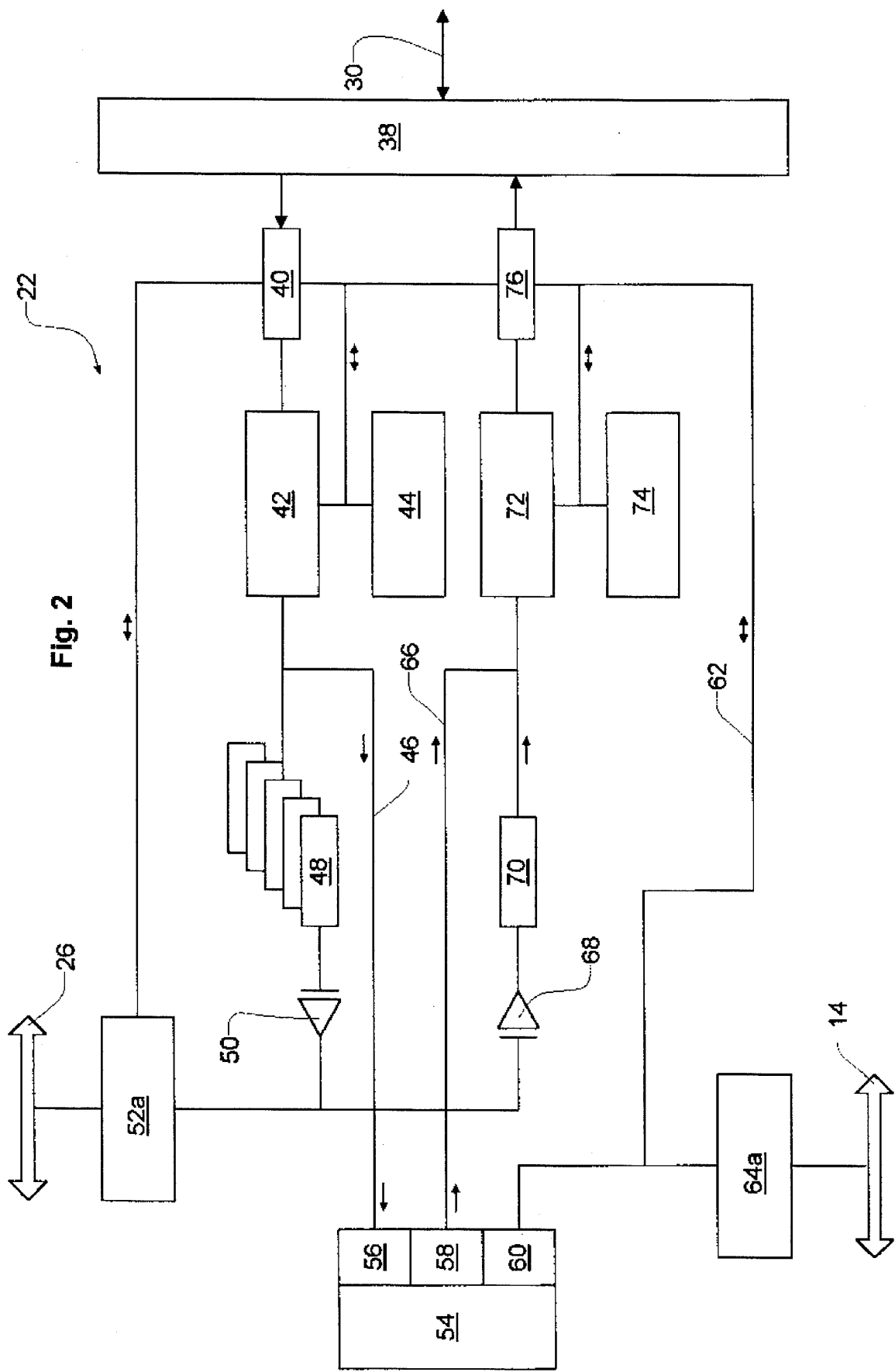
FIG. 2 is a block diagram of the network interface board of FIG. 1.

FIG. 2 is a more detailed block diagram of the network interface board 22. As can be seen in the view of FIG. 2, a Synchronous Optical Network ("SONET") interface 38 converts fiber optic signals carried on the network interface connection 30 to electrical signals employed within the network interface board 22, and vice versa (data flow is bidirectional in the network interface connection 30. The SONET interface 38 will be discussed in more detail hereinafter. Data flow on the network interface connection 30 is in the form of ATM cells. Alternative ATM cell structures are defined beginning at page 90 of the aforementioned CCITT report. Incoming data (now embodied as electrical signal ATM cells) is sent to an input buffer 40 which, in the best presently known embodiment 10 of the present invention is a 512×16 bit FIFO buffer. From the input buffer 40 incoming data is provided to a segmentation and reassembly—receive unit ("SARA-R") 42. The SARA-R 42 is an ATM reassembly processor for reassembling incoming ATM cells (received from the input buffer 40) into their original signal format(s) and separates constant bit rate streams for the ISOBUS 26, and is a unit commercially available from TranSwitch Corporation. In accordance with the normal operation of the SARA-R, a reassembly control memory 44 is provided.

Reassembled signals from the SARA-R 42 are provided onto a receive bus 46. Constant Bit Rate signals on the receive bus 46 are recognized and buffered at a plurality (16 in the best presently known embodiment 10 of the present invention, of which 5 are depicted in the simplified view of FIG. 2) of CBR receive buffers 48. From the CBR receive buffers 48 the CBR signals are converted from 32 bit to 16 bit format at a 32/16 bit convertor 50, and are then provided (now in 16 bit form) to an IsoChannel interface 52 (since there are multiple instances of an IsoChannel interface 52 in the best presently known embodiment 10 of the present invention, the present instance is designated herein as a network board IsoChannel interface 52a). The network board IsoChannel interface 52a interfaces the CBR signals to the ISOBUS 26.

One skilled in the art will recognize that CBR signals (otherwise known as synchronous signals) include most forms of video signaling wherein data flow can be defined in units of fixed length. Asynchronous signals, on the other hand, are defined as being provided in "packets" of relatively indeterminate length. As one example, LAN signaling (as in the ETHERNET protocol) is generally accomplished using packet signals. In the best presently known embodiment 10 of the present invention, packet signals are picked up from the receive bus 46 by a packet memory 54. The packet memory 54 is a 256×36 bit DRAM with a receive port 56, a send port 58 and a host bus port 60.

From the packet memory 54, asynchronous signals are communicated through the host bus port 60 to a host bus 62. The host bus communicates through a host bus interface 64 of the network interface board 22 to the computer bus 14 of the computer 12 (FIG. 1) which, as previously discussed, is a microchannel bus in the best presently known embodiment 10. of the present invention. Since there are multiple instances of a host bus interface 64 in the best presently known embodiment 10 of the present invention, the present instance is designated herein as a network board host bus interface 64a). Asynchronous signals from the packet memory 54 are routed and processed by the computer 12 in conventional manner according to the specific type of asynchronous signal involved. In general, the fact that the asynchronous signals are introduced to the computer bus 14 via the network card 22 (as opposed to a card specifically adapted for interface of just one specific type of asynchronous signal) will not be of relevance to the manner in which the computer 12 processes such asynchronous signal(s). Asynchronous signals generated by the computer 12 will be returned through the computer bus 14 and the network board host bus interface 64a to the packet memory 54 (through the host bus port 60 thereof).

From the packet memory 54 outgoing asynchronous signals are output through the send port 58 to a send bus 66. Synchronous signals coming from the ISOBUS 26 are returned through the network board IsoChannel interface 52a and then through a 16/32 bit convertor 68 to a CBR send buffer 70 From the CBR send buffer 70 the outgoing synchronous signals are provided to the send bus 66. Signals on the send bus 66 which, as previously discussed include both synchronous signals from the IsoChannel bus 26 and asynchronous signals from the packet memory 54 are provided to a SARA-S 72.

The SARA-S 72 is a processor, available from the same source as is the SARA-R 42, for assembling digital signals into ATM cells. As is customary for the functioning of the SARA-S 72, a segmentation control memory 74 is provided. Outgoing ATM cells (signals) are buffered at an output buffer 76 on their way to the SONET interface 38 for conversion to fiber optic signals for output to the network interface connection 30.

CBR data and packet data are kept from clashing on the send bus 66 because, when CBR data is present the SARA-S 72 is interrupted (CBR data being given higher priority than packet data). If there is no CBR data on the send bus 66 or in the output buffer 76 then the SARA-S 72 sends packet data from the send port 58 of the packet memory 54 if there is any to send. Otherwise, the SARA-S 72 sends empty ATM cells.

As can be seen in the view of FIG. 2., and as can be appreciated by one skilled in the art, the host bus 62 communicates with the packet memory 54, the network board IsoChannel interface 52a, the network board host bus interface 64a, the input buffer 40, the output buffer 76, the SARA-R 42, the SARA-S 72, the reassembly control memory 44 and the segmentation control memory 74 for operation under control of the CPU 16 (FIG. 1) of the computer 12.

Figure 3:
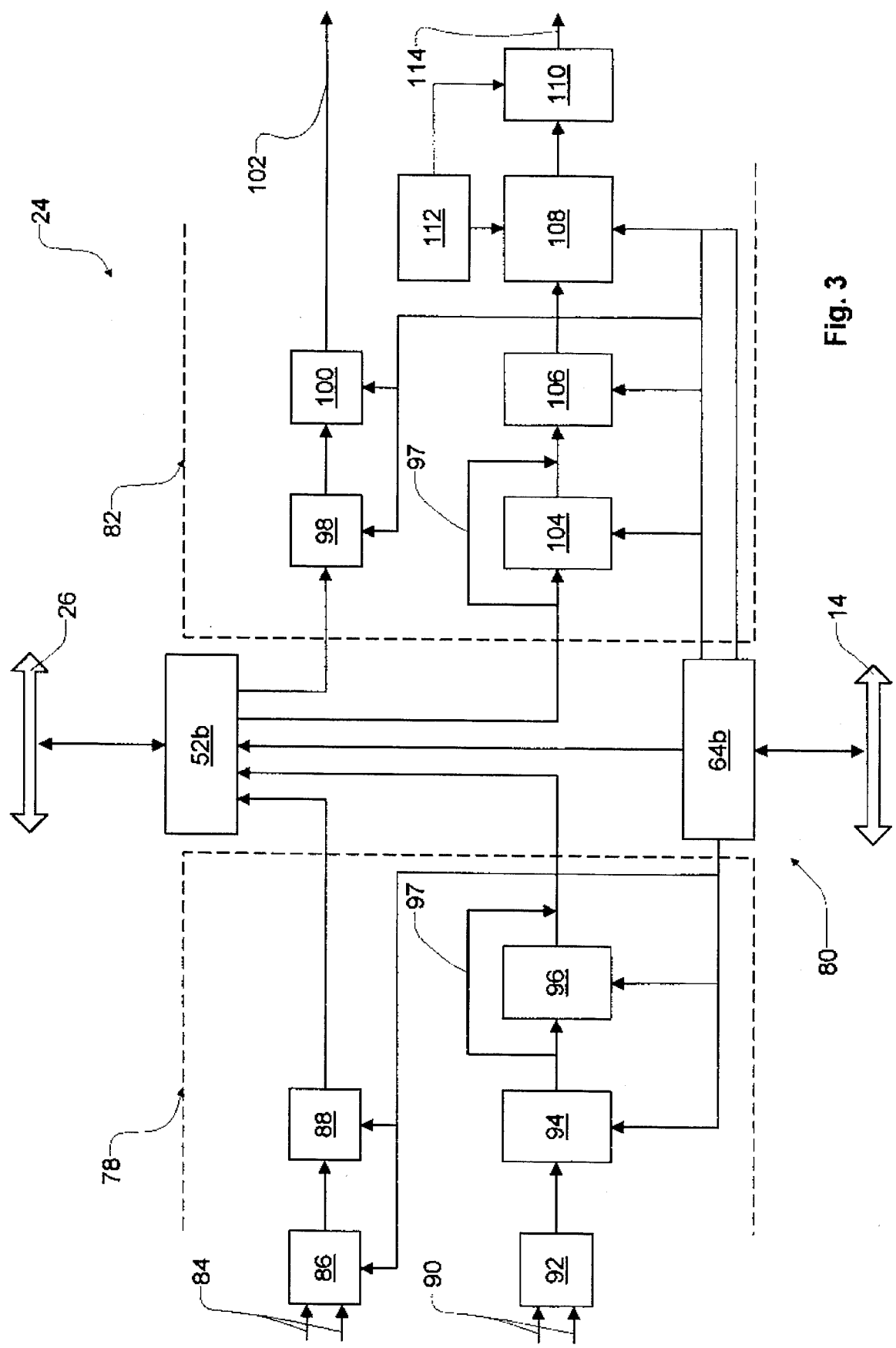
FIG. 3 is a block diagram of the video board of FIG. 1.

FIG. 3 is a more detailed block diagram of the video board 24 of FIG. 1 according to the best presently known embodiment 10 of the present invention. It should be noted that, in some limited applications where video and/or audio input and/or output is not required, it will not be necessary to include a video board 24. However, where video or audio input or output is required the video board 24 according to the best presently known embodiment 10 of the present invention will be used in the multimedia network system 10. Since it is a primary purpose of the present invention to enable video and audio input and output, it is anticipated that in most applications the video board 24 will be included, as illustrated herein.

As has been previously discussed, the video board 24 is connected both to the computer bus 14 and to the ISOBUS 26. The video board 24 according to the best presently known embodiment 10 of the present invention is conceptually divided into three functional subsystems: an input subsystem 78, an interface subsystem 80 and an output subsystem 82.

A plurality (two, in the example of FIG. 3) of audio inputs 84 are provided to an audio input processor 86 and then to an input audio control unit 88. In the best presently known embodiment 10 of the present invention, the audio input processor 86 is adapted for accepting Audio Engineering Society ("AES") stereo standard inputs and ALaw or ULaw audio inputs (ALaw and ULaw audio are the designations of the data formats used in conventional digital telephony). The audio input processor 86 converts analog audio signals to digital.

An additional plurality (two, in the example of FIG. 3) of video inputs 90 are provided to a video A/D convertor 92, a color decoder 94 and a pixel decimation unit 96. The color decoder 94 converts raw digitized video into conventional YUV4,1,1 format.

The pixel decimation unit 96 removes data from the digital video image (as by eliminating every other line and every other pixel from the remaining lines of the image) to reduce the amount of digital information that must be transmitted. This process, of course, reduces the image quality somewhat, but this is a desirable trade off in many applications. As indicated in the view of FIG. 3, a bypass 97 is provided for selectively (under control of the computer 12) bypassing the pixel decimation unit 96. In many instances of application, high quality video is not required and the data additional data compression provided by the pixel decimation unit 96 is most desirable. However, in some applications (such as video product brochures and negotiation conferences wherein it is desirable to closely view the party with whom one is communicating) it will be desirable to bypass the pixel decimation unit 96 to allow full quality video.

Processed audio and video signals are provided to a video board IsoChannel interface 52b in the interface subsystem 80 of the video board 24. Also, as can be seen in the view of FIG. 3, the audio input processor 86, input audio control unit 88, color decoder 94 and pixel decimation unit 96 operate under control data (generated by the CPU 16 (FIG. 1) of the computer 12) and provided through the computer bus 14 and a video board host bus interface 64b of the interface subsystem 80.

Video and audio signals (in digital format, as previously discussed in relation to the network interface board 22) are also received over the ISOBUS 26 and forwarded to the output subsystem 82. In the best presently known embodiment 10 of the present invention, since only two components, namely the network interface board 22 and the video board 24 are connected to the ISOBUS 26, signals arriving at the video board 24 on the ISOBUS 26 must necessarily have been produced to the ISOBUS 26 from the network interface board 22. However, it is contemplated by the inventors that, in at least some applications, there may be additional devices contributing to or receiving signals to and from the ISOBUS 26, and the present invention is not restricted to this specific limitation of the best presently known embodiment 10. Also, as can be seen in the view of FIG. 3, the output subsystem 82 operates according to control data received from the computer bus 14 and forwarded through the video board host bus interface 64b.

The output subsystem 82 of the video board 24 has an output audio control unit 98 and an audio output processor 100 for converting the digitized audio arriving at the video board 24 on the ISOBUS 26 into a conventional analog audio output 102. In the best presently known embodiment 10 of the present invention, the audio input processor 86 and the audio output processor 100 are actually physically embodied together in the same mechanical package, although this is not a necessary aspect of the invention.

Also in the output subsystem 82 are a pixel expansion unit 104 for restoring missing data from images that have been pixel decimated (discussed previously herein in relation to the pixel decimation unit 96). As indicated in the block diagram of FIG. 3, a second bypass 97 is provided for bypassing the pixel expansion unit 104 for those applications wherein it is not necessary to reconstitute a pixel compressed image. The output subsystem 82 further has a color space convertor 106, a video ram 108, a video D/A and multiplexer 110 and a windowing engine 112.

As discussed in part above, the pixel expansion unit 104 adjusts incoming decimated video signals to simulated PAL/NTSC and YUV4,1,1 signals. The color space convertor 106 converts YUV4,1,1 to conventional RGB. The resulting RGB encoded data is temporarily stored in the video ram 108 to be acted upon, as requested by the operator via software drivers, by the windowing engine 112 to provide a video output 114 through the video and D/A and multiplexer 110 to the video monitor 36a (FIG. 1). The video D/A and multiplexer 110 converts the RGB into conventional VGA analog format and further mixes data incoming from the BISDN network 28 (FIG. 1) with additional video signals incoming from video inputs 90 and/or video supplied by the computer 12 (FIG. 1).

The video output 114 is provided from the video D/A and multiplexer 110 to the video monitor 36a (FIG. 1). In the best presently known embodiment 10 of the present invention, the video output 114 is a conventional Super Video Graphics Array ("SVGA") compatible signal.

Figure 4:
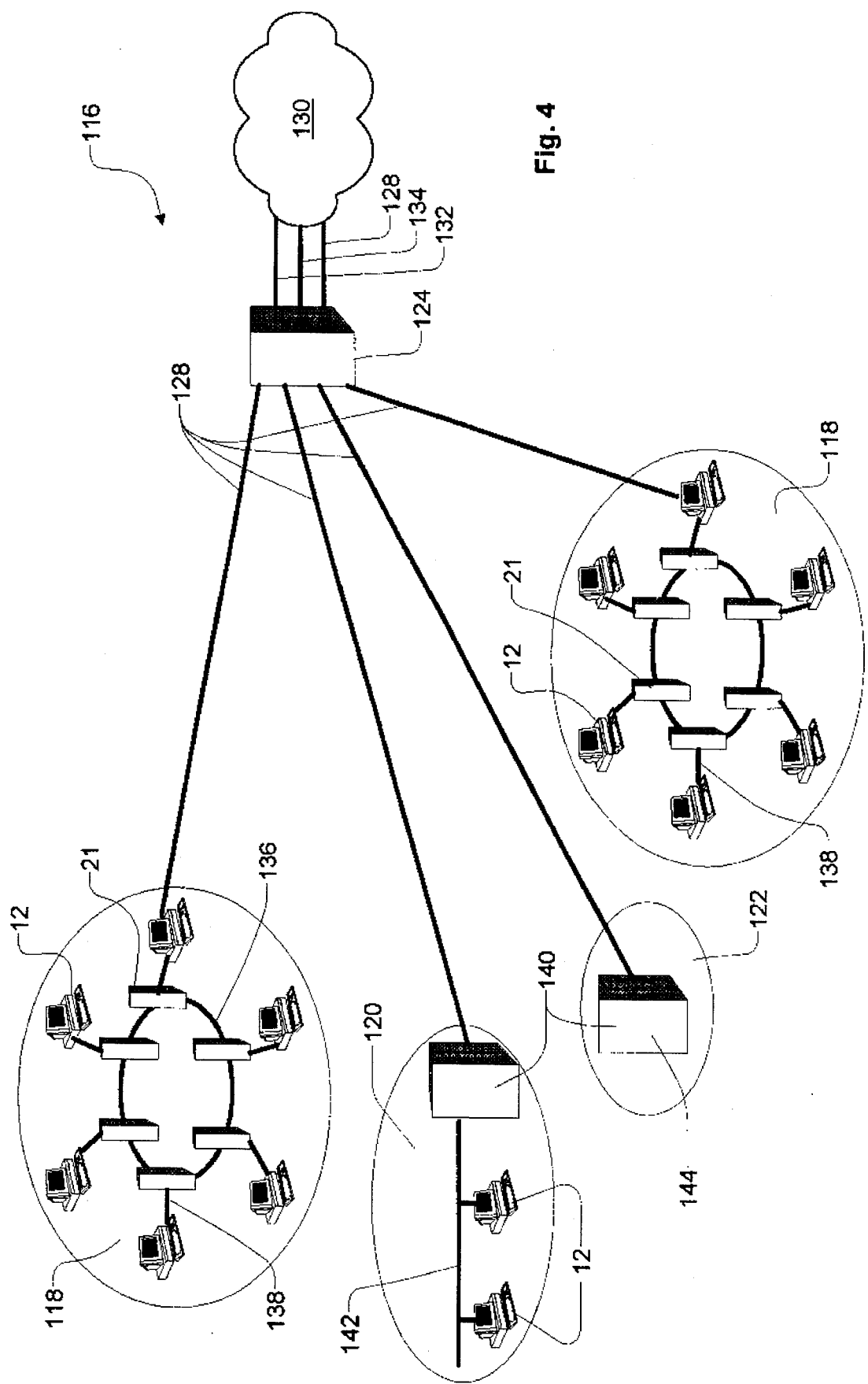
FIG. 4 is an example network configuration employing the inventive multimedia network system.

FIG. 4 is an example network 116 configuration employing the multimedia network systems 10. The quantity and arrangement of each of the components in the illustration of FIG. 4 is for the purpose of example only, and is not intended to be limiting. The network 116 in the example of FIG. 4 has a plurality (two in the example of FIG. 4) of Local Area Networks ("LANs") 118, a conventional (non-multimedia) work group LAN 120, and a media resource center 122 connected to an Asynchronous Transfer Mode ("ATM") switch 124 by a plurality (four in the example of FIG. 4) of BISDN busses. The ATM switch 124 is further connected to a public switched network 130 by an additional BISDN bus 128, an ISDN bus 132 and a switched multi-megabit data service ("SMDS") bus 134 to provide flexibility in communications with the public switched network.

In the multimedia work group LANs 118, computers 20 (the term computers 12 is used generally here, as one skilled in the art will recognize that workstations on a LAN can consist of computerized devices, point of sale terminals and related devices being examples, which are generally not specifically referred to as computers) are connected within in the multimedia LANs 118 through a matching plurality of the network interface subsystems 21 by isochronous, high bandwidth, busses which meet IEEE 802.6 standards ("IEEE 802.6 busses") 138. As used herein, the term "isochronous" refers to a transmission mode which pre-allocates regular, periodic transfer slots on a link. Fixed length ATM cells are used as the common transport mode throughout the multimedia LANs 118.

To provide backward compatibility, the conventional non-multimedia LAN 120 is connected to the ATM switch 124

(through the associated BISDN bus 128) by a router 140. The computers 12 of the non-multimedia LAN 120 are connected to one another and to the router 140 by a bus conforming to IEEE 802.3 standards ("IEEE 802.3 bus") 142.

The media resource center 122 in the example of FIG. 4 has therein a broadband information server ("BIS") 144.

The multimedia LANS 118 support the capture, storage, transfer and display of audio and video digital data streams (as well other types of digitally encoded information) in a networked environment. The network 116 including the multimedia LANs 118 enables networked video conferencing, audio video databases, and the like, within the network 116.

Figure 5:
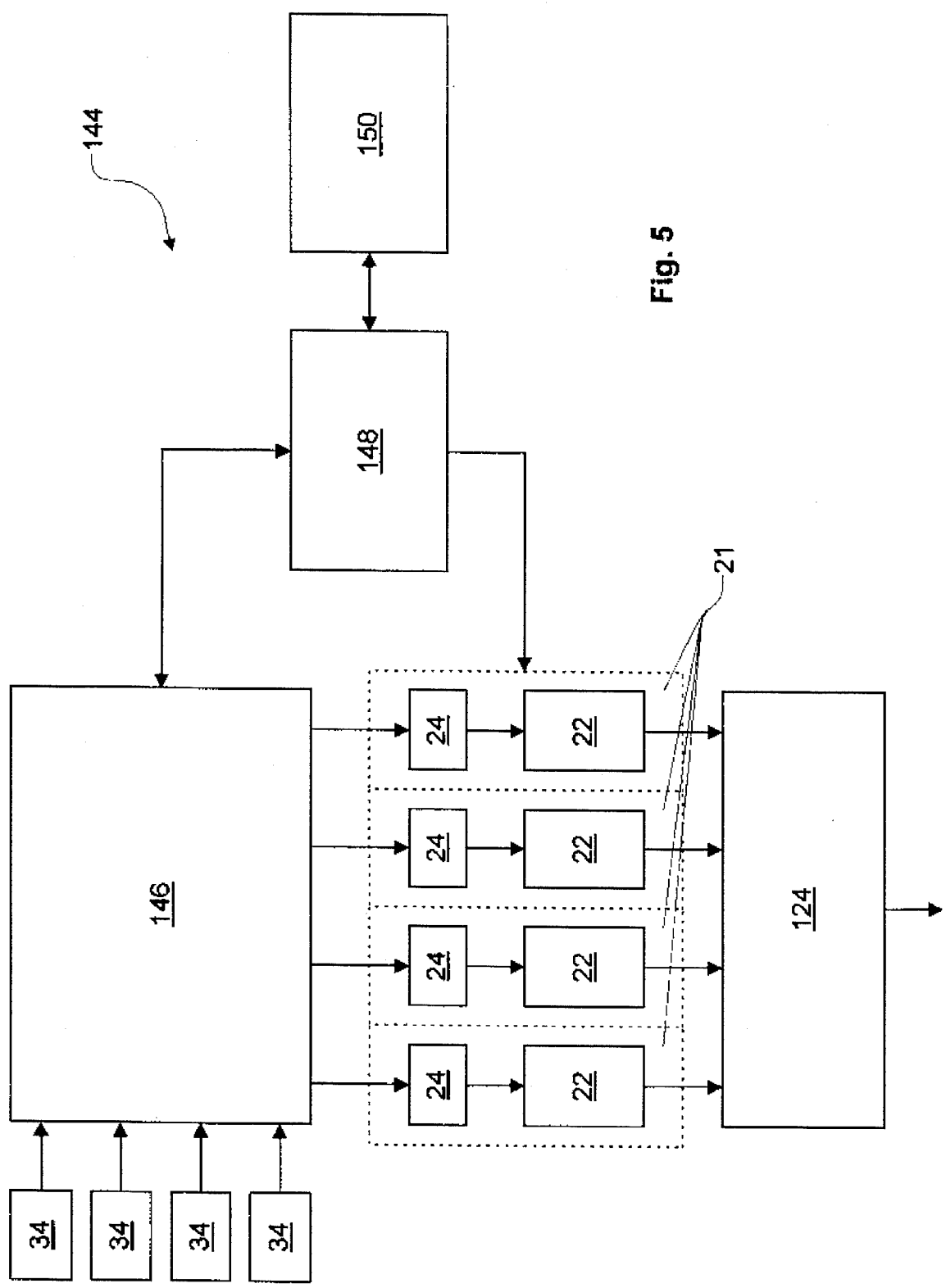
FIG. 5 is a block diagram of an example of the broadband information server of FIG. 4.

An example of the BIS 144 of FIG. 4 is illustrated in block schematic form in FIG. 5. As can be appreciated in light of the above discussion, the BIS is intended to provide video information, upon demand, to other devices connected to the network 16 (FIG. 4). In the example of FIG. 5, the BIS 144 is equipped with a plurality (four in the example of FIG. 5) of audio/video input devices 34 (examples of which have been discussed previously herein in relation to FIG. 1) providing input through an analog crossbar switching matrix 146 to a plurality (four in the example of FIG. 5) of the network interface subsystems 21 previously discussed in relation to FIG. 1. As described, each of the network interface subsystems 21 is equipped with a video board 24 and a network interface board 22. As previously discussed herein in relation to FIG. 4, output from the BIS 144 is provided to the ATM switch 124 for distribution to the network 116 (not shown in the view of FIG. 5). A control unit 148 is provided for controlling the analog crossbar switching matrix 146 and the network interface subsystems 21, as previously discussed herein. A mass storage unit 150 is provided for storing the audio/video information acquired from the audio/video input devices 34 such that it can be sent out to the network 116 upon demand.

Figure 6:
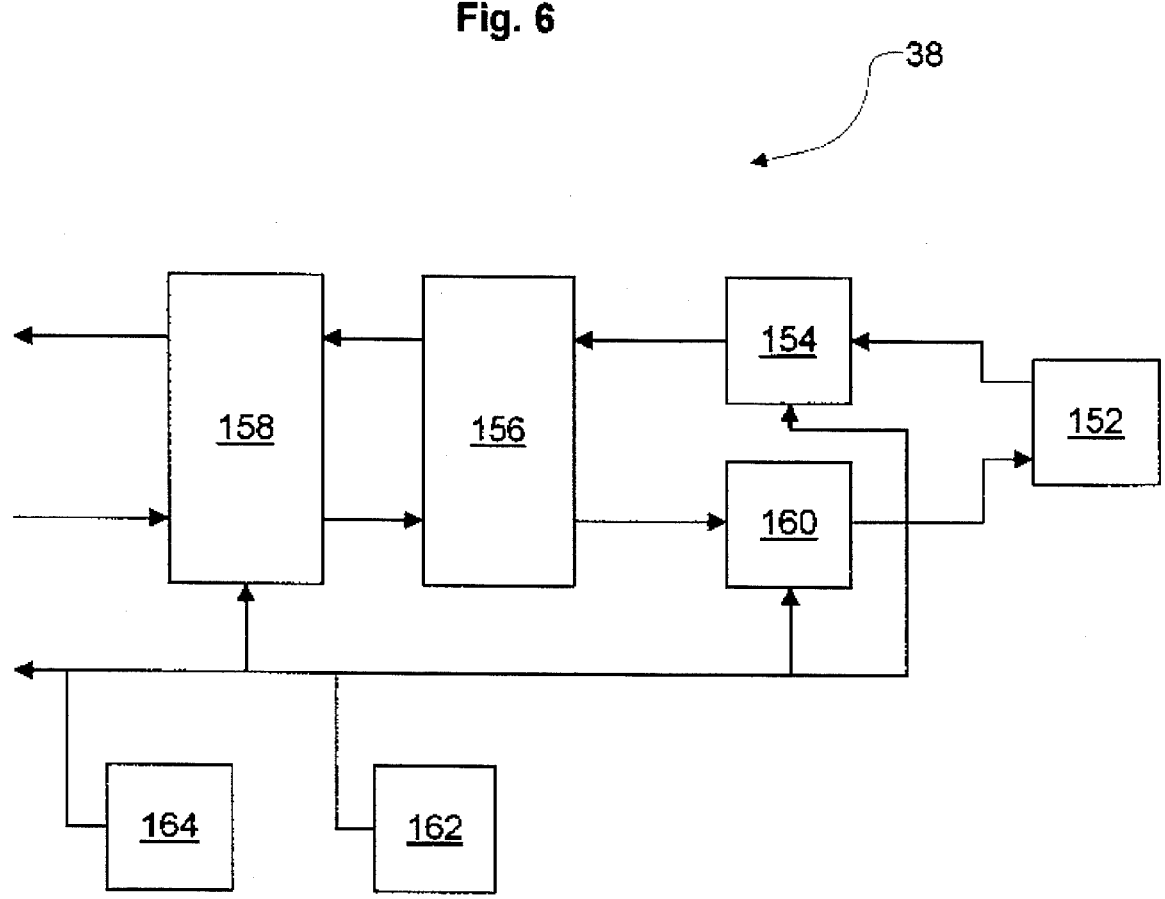
FIG. 6 is a more detailed block diagram of the SONET interface of FIG. 2.

FIG. 6 is a block diagram showing the makeup of the SONET interface 38 of FIG. 2 as it is constructed in the best presently known embodiment 10 of the present invention. As can be seen in the view of FIG. 2. The SONET interface 38 has an optical transceiver 152 for receiving and transmitting optical signals. Although it was not originally intended for this sort of application, a transceiver commonly available from Sumitomo has been adapted as the optical transceiver 152 in the best presently known embodiment 10 of the present invention. A receiver 154 is provided for accepting signals from the optical transceiver 152 and forwarding them to a field programmable gate array ("FPGA") 156 and a SONET termination unit 158. The receiver 154 is part number S3006 supplied by AMCC and is designed specifically for operation in accordance to SONET OC-3 specifications. As can be discerned in more detail in the specifications available from the manufacturer, the receiver 154 provides clock separation, serial to parallel conversion, frame synchronization, loss of signal sensing, frame loss alarming ECL to TTL level translation and both line and terminal loop back capability. The SONET termination unit 158 is a part number SOT-3 available from TransSwitch. SONET functions are provided by the SONET termination unit 158 in accordance with the design intent of the manufacturer. The FPGA is a type 1224 field programmable gate array available from ACTEL.

Also provided in the BIS 144 is a transmitter 160 for receiving signal from the FPGA 156 and forwarding it to the optical transceiver 152. The transmitter 160 is part number S3005 available from the same source as previously cited for the receiver 154. The transmitter, 154 provides parallel to serial conversion, clock generation, terminal and line loopback, TTL to ECL translation and line encoding functions. A crystal oscillator 162 is provides a reference clock for the SONET interface 38 (FIG. 2) and the master clock for CBR functions on the network interface board 22 (FIG. 1). (As previously discussed herein, each board connected to the ISOBUS 26 should, according to the best presently known embodiment 10 of the present invention, be capable of providing system clock.

In order to completely discose the present invention for the benefit of those skilled in the art who wish to understand the exact manner in which the best presently known embodiment 10 of the present invention carries out the inventive method and means, a detailed description of the communication protocol for the ISOBUS 26 is included herewith as appendix A hereto. A detailed description of the remainder of the data communications protocols operating within the network interface subsystem 21 is included as appendix B hereto.

As is shown above, in great part, the multimedia network system 10 according to the present invention provides a means for implementing communications within and between a great variety of computer devices, and both within and between a variety of computer networks and other computer interconnection means. Among the substantial differences between the present inventive multimedia network system 10 and the prior art are the inclusion in the network interface board 22 of the enabling means described herein for communicating both synchronous and asynchronous data in a manner such that the differentiation between data types is essentially transparent to the user. Furthermore, the unique division of functions between the network interface boards 22 and the video boards 24, and the unique ISOBUS 26 for transmitting high speed CBR data therebetween provide a level of versatility of data communications unknown in the prior art, particularly since the video boards 24 and the network interface boards 22 can be used in various combinations and quantities according to the needs of a particular application, as previously discussed herein in relation to the BIS 144. Circuitry details of the present invention are conventional given the functional descriptions and interrelationship of the various components described herein, and no significant changes of materials are envisioned nor are any special constructions required.

Various modifications may be made to the invention without altering its value or scope. As just one example, as increasing production quantities of the inventive multimedia network systems 10 permit, it should be possible to combine functions described herein as being embodied in separate subunits into integrated circuit packages.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The multimedia network system 10 is intended to be widely used in a great variety of digital data communications. Indeed, it is difficult to point to one specific intended usage that would be more likely to predominate over others. As just an example, the inventors are developing an application wherein department store point of sales terminals could be connected to a central data base by means of the inventive multimedia network system 10. In such an application, not only could the purchaser's credit data be made available in real time, and the purchaser's account updated as the sale is made, it would even be possible to display the user's picture at the point of sale (to verify identification) and/or to transmit an image of the user's fingerprint from the point of sale for computerized comparison to data base fingerprints. As the science of retinal laser identification is perfected, this means of identification could also be added to the system.

Additional prospective applications range from the communication of weather radar images to interested weather observers (in which case, a radar unit (not shown) would be added as an additional audio/video input device 34) to the accomplishment of more mundane tasks such as computerized "shop at home" services, and the like.

The present inventive multimedia network system 10 has application for both "on line" type services such as bulletin boards (wherein the user is charged for time on the system) and "on demand" services wherein the user is charged a fixed fee for a transaction (or a fixed purchase price, or the like).

In summary, it is the very purpose of the present invention not to be restricted by the type of data which it is desired to communicate. Therefore, the industrial applicability should be limited only by the imagination of the users of the invention. A more detailed discussion of how the present invention might interface with the several emerging related technologies is included here as appendix C hereto.

The multimedia network system 10 of the present invention may be utilized in any application wherein a conventional computer data communications means are used. Furthermore, the inventive multimedia network system 10 is expected to create new applications wherein the communication of digital information might be useful.

Since the multimedia network system 10 of the present invention may be readily constructed and may be adapted for use with existing computer equipment and other existing peripheral devices it is expected that it will be acceptable in the industry as a substitutes for existing data communications means. For these and other reasons, it is expected that the utility and industrial applicability of the invention will be both significant in scope and long-lasting in duration.

APPENDIX A
IsoChannel Timing
9/30/92
Basic Clock Rate: 38.88 MHz or 25.720164 ns
IsoChannel Time Zones = 169 per second
Tcl = IsoChannel Cell Period = 26 clocks @ 25.720164 ns = 668.724 ns
Ttz = IsoChannel Time Zone Period = 1 / 169 = 5.917159 ms
Ncz = Number of Cell Periods per Time Zone = Ttz / Tcl
Ncz = 5.917159 ms / 668.724 ns = 8848.432238
Ncz = 8848 + (.432238 * 26 clocks / Cell Period) = 8848 + 11 Clocks
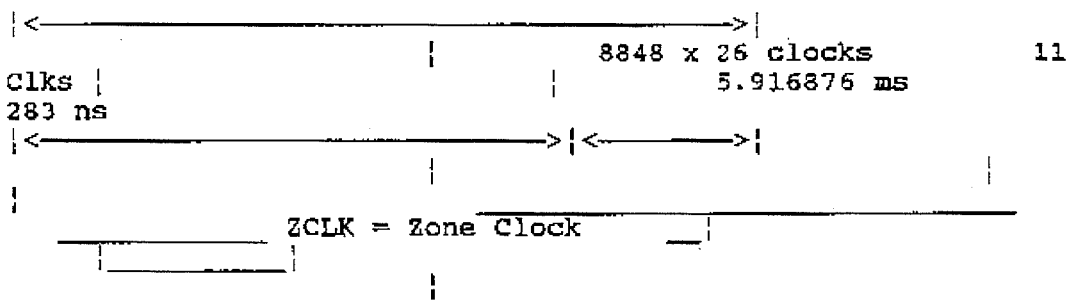
For an overview of IsoChannel sequencing see Dwg. #CBM-B102

ICSRAM:   IsoChannel Scheduling

IsoChannel traffic is governed by the schedule of isochronous cell traffic at the IsoChannel. One cell period at the IsoChannel consists of 26 clocks. 24 clock times are used to transfer cell data two bytes wide and two clock times are used for overhead. Each cell time is associated with one of 64 IsoChannel users, identified by a six bit IsoChannel User ID field (IUID).

Each circuit board residing on the IsoChannel is controlled by three enable signals, the 38.88 MHz bus clock and a special control RAM called the IsoChannel Scheduling RAM (ICSRAM). The ICSRAMS are individually written and maintained by the host as new CBR virtual circuits are established and torn down. Each RAM uses 8848 locations, coinciding with the 8848 IsoChannel cell periods and cycles through all locations in one IsoChannel Time Zone Period.

Each IsoChannel board is assigned one (or several) IUIDs and looks for that ID at the output of the ICSRAM to determine when to talk, listen or idle. The RAM is byte wide, 6 bits for the IUID and 2 control bits encode the expected activity. The two control bits are encoded as follows:

```
        Bit 7   Bit 6
        -----   -----
          0       0     Idle
          0       1     Talk: Write data to the bus
          1       0     Listen: Read data from the bus
          1       1     Talk and listen (used for testing)
```

The ICSRAM address counter is updated two clocks prior to the start of a cell period, to allow time for the logic to prepare for the upcoming cycle. The address counter is reset during the low time of ZCLK.

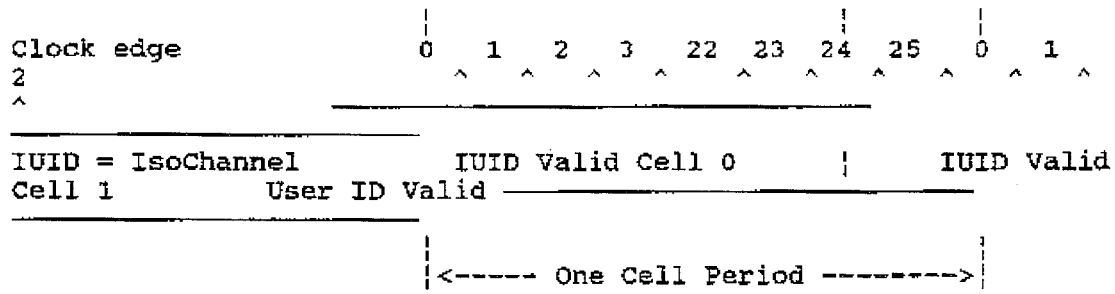

IsoChannel Data Path

The IsoChannel data path is implemented as a three deep pipeline: an edge triggered latch is used at the entrance and exit from the IsoChannel itself, resulting in three pipeline phases.

Within a Cell Period, three enable signals are used to sequence the pipelined data transfer over IsoChannel. TENA is used by the IsoChannel "Talker" to enable 24 waves of two-byte-wide data at each clock edge, which are latched at REG T. The zeroeth data wave is valid on the input to the IsoChannel latch at the onset of the enable signal and changes with the first clock edge.

IENA is used to enable latching at the listener board, REG L, one clock later. Finally LENA is used by the listener to provide 24 timeframes to write REG L data to the onboard destination.

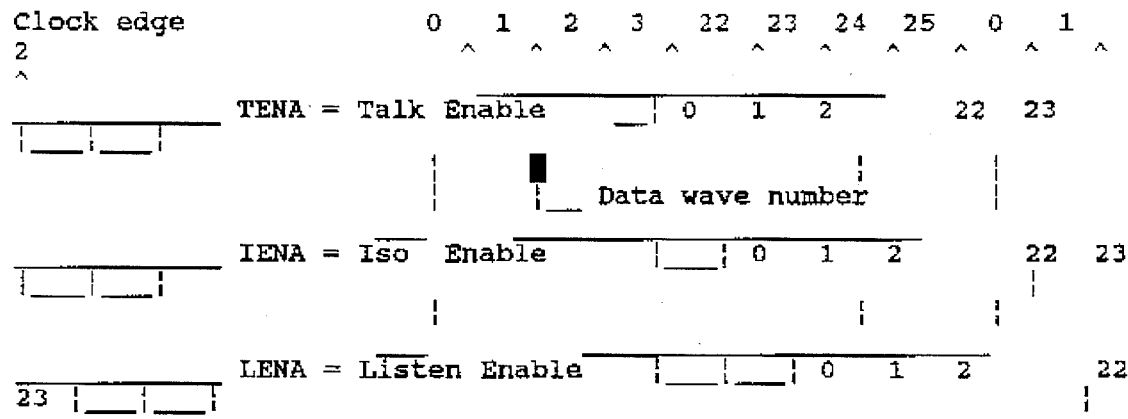

QBUS Interface to Host

ICSRAMS are individually loaded by the host. The RAMs are memory mapped to the host address space and located at offset 0x40000 from the base address of the board (addresses 40000 to 4228f). QBUS is a local bus used to distribute host bus signals to the IsoChannel control block as well as other board resources. QBUS timing is shown on Dwg. CBM-T101; QBUS signals are described below.

| | | |
|---|---|---|
| QD00..7 | I/O | A bidirectional eight bit local data bus. |
| QA00..15 | I | Sixteen bit local address bus. |
| QMEMRD* onto | I | Active low signal used to gate the read data onto the data bus. |
| QMEMWRT* | I | Active low write enable signal |
| QALE address. | I | Active high pulse used to latch an incoming address. |
| QCHWAIT* (and | O | Open collector signal driven by IsoChannel logic (and other board logic) to extend the cycle time. |
| ISOCS* bits. Directs IsoChannel devices. | I | A decode of the high order QAnn address bits. Directs the memory operation to the IsoChannel devices. |
| ISOINTR* which ISOCS2*. | I | IsoChannel interrupt request for service. Use an open collector driver. If there is more than one reason to interrupt, provide a status register which can be read and written by the host using ISOCS2*. |
| ISOCS2* address bits. registers | I | A second decode of the high order QAnn address bits. If other control pulses or status registers need to be implemented they are mapped to address space 48000 thru 4800f. |

APPENDIX B

1. SCOPE 1.1 Introduction
The recent introduction of suitable operational standards, sophisticated application specific integrated circuits, and the potential of common carrier implementation of long distance high speed constant bit services in accordance with the standards has enabled an opportunity for high quality video networking. One of the necessary components to exploit this opportunity is a DATA-FLOW (MediaNet(tm))architecture to enable end to end(terminal to terminal) and server to terminal constant bit rate services. CBM Inc. has a family of products to implement this architecture. One of the primary functions necessary for proper functioning of a data-flow system is a method for generating and terminating audio and video information. This functionality is embodied in the CBM Inc. MNAV1mc audio/video board.

1.2 MNAV1mc
The CBM Inc. MNAV1mc is a Micro-Channel compatible audio/video display/ capture board with an isochronous bus connection to allow constant bit rate services to be used for the purpose of capturing and transmitting real time audio and video as well as receiving the audio and video.
The MNAV1mc supports capture of PAL or NTSC video and conversion to YUV 4,4,1 for transmission over the IsoChannel(tm) to the network board for connection to the outside world. Iso Channel is part of CBM'S data flow architecture allowing for data to flow constantly and smoothly to or from terminals, servers, switches, or bridges.

The MNAV1mc supports capture of audio in two forms. One is telephone quality digital audio in uLaw or Alaw standards. The other form is AES(Audio Engineers Society) digital stereo.

The MNAV1mc supports the display of real time video from the network or from local sources.

The MNAV1mc supports the regeneration of digital audio from the network in both forms.

The MNAV1mc operates in concert with windows 3.1 and proprietary CBM software to implement a smoothly functioning operator interface for connection to video conferencing, video data bases, security systems, retail sale or other information kiosks, as well as applications encompassing mutual document editing, and Vmail.

2. Functional description

The CBM Inc. MNAV1mc is a PCB assembly that interfaces Iso Channel(tm) to analog video and audio I/O. The data present on the Iso Channel is comprised of time slots. The slots are carrying video, audio, or other constant bandwidth signals.

In control terms, the MNAV1mc is a device that is setup by
external signaling from the host bus. After initialization and
setup, the MNAV1mc accepts slots and converts them to the
appropriate analog form and accepts analog input and formats them
into slots cells and transmits them on the IsoChannel bus.

The analog side of the board interfaces to video and audio
connections. The video is PAL/NTSC composite analog video and the
audio interface is single channel voice grade analog or AES
stereo.

The Micro Channel host bus interface provides power and a data
path for setting and reading board parameters as well as still
frame capture interface.
The Iso Channel interface is responsible for maintaining
synchronization with the bus, receiving control information from
the host bus, receiving data on its assigned slots, and sending
data on its assigned transmit slots. The MNAV1mc uses BTL
transceivers for the line electrical interface. All transactions
are as assigned by the controlling software. Local display of
captured data can be done by setting slot assignments on the
IsoChannel to transmit and receive on the same time slots.

2.1 IsoChannel interface

The IsoChannel interface is a slotted time domain
multiplexed data bus designed specifically for transport of
constant bit ' rate services to and from network and audio/video
subsystems. The IsoChannel is implemented using FPGA
technology to CBM'S functional specification. The IsoChannel
is a 16 bit wide bus at a basic clock rate of 38.88 Mhz. The
IsoChannel is divided into 169 frames or zones per second.
Each frame is further divided into 8848 slots. (plus a spare
11 clocks at frame time. The signals on the bus are the 16
data lines, the 38.88Mhz clock, and a frame clock, and a
payload signal. It is required that any IsoChannel device be
capable of providing the clock, however only one is chosen in
an IsoChannel equipped system to do so. The payload signal is
driven by whichever device is assigned the transmit function
in a given slot.
The host computer has the responsibility of controlling the
operation of the IsoChannel. The control of the IsoChannel
is accomplished by loading a ram whose operation is
synchronized and mapped to the IsoChannel slots. IsoChannel
traffic is governed by the schedule of isochronous cell traffic
at the IsoChannel. One slot period at the IsoChannel consists
of 26 clocks. 24 clocks are used to transfer cell data two
bytes wide and two clock times are used for overhead. Each
cell time is associated with one of 64 isochronous users,
identified by a six bit wide user ID field in the control
ram. In addition two bits in each byte of the control ram are
devoted to read or write commands to/from the bus inconjunction Another short-term solution is frame relay. Frame relay service is ramping up faster than SMDS, but it is limited to T1 speed. The usage-sensitive feature of frame relay is a big benefit for slower applications, but multiservice applications will be at the high end of the T1 range, not the low end. Eventually frame relay will migrate to T3, but SMDS may well arrive first and provide the general connectivity that frame relay, with its permanent virtual circuits, cannot match.

A dark horse for interconnecting multiservice sites is primary- rate ISDN. The acceptance of ISDN in the US has been so slow that it would be risky to count on basic-rate ISDN, let alone primary rate ISDN, in most parts of the country in the next few years. The market failures of ISDN have convinced most of the players to wait for a new roll of the dice— some looking at frame relay and some at SMDS.

video     processor.

Provides frame buffering of the incoming video data stream which    is coordinated with the graphics subsystem via the video processor    working  in conjunction D/A converter and analog switch.

2.2.2 Output video function (To IsoChannel bus)

The Capture video function is implemented using Philips A/D chroma   and luminance A/D converters (TDA8709/ TDA8708) in association with   a video multi-standard decoder.(SAA7151) This combination captures   and converts PAL or NTSC analog data to chroma and      luminance data    streams and decodes the chroma and luminance data to YUV 4,1,1.   Further processing is implemented in FPGA technology for the purpose   of concatenating data, (Removes non displayed samples) and decimating    data for CIF resolution if necessary.

2.3 Audio subsystem (CODEC)

With the exception of encapsulation of data and the unloading of data   from IsoChannel, the audio subsystem is primarily the responsibility  a single IC.(Analog Devices AD1849) This device contains everything    needed for both AES stereo and monaural companding of audio information.   The features implemented on the MNAV1mc are as follows:
Frame synchronization of AES data stream.

Data field decode for host examination.

Sigma/Delta D/A conversion

Programmable mute function.

Stereo and mono audio line outputs.

Line and microphone inputs.

Programmable gain.

Sigma/Delta A/D conversion.

Monitor function.

Converts analog audio data to an ALAW or uLAW POTS digital data    stream.

Converts POTS digital data stream to analog audio.

Some support for the AD1849 is built into the FPGA for encodeing the  data for transport by the IsoChannel. These are frame synchronization   of AES data stream for proper decoding and data field encapsulation     and framing for IsoChannel transport.

2.4 Host bus interface.

The MNAV1mc host bus is a MicroChannel(tm) compatable interface which provides the interface to the host CPU for control and status data interchange for each of the features available on the board.

2.5 Mechanical description

The MNAV1mc conforms with the mechanical standards for Micro Channel. The connections for audio and video are a 26 pin "D" and have the pin assignments as follows:

| Signal | Pin# |
|---|---|
| video in (signal) | 8 |
| video in (return) | 17 |
| audio line out left(signal) | 4 |
| audio line out left(return) | 13 |
| audio line out right(signal) | 5 |
| audio line out right(return) | 14 |
| audio line in left(signal) | 2 |
| audio line in left(return) | 11 |
| audio line in right(signal) | 3 |
| audio line in right(return) | 12 |
| audio mono out(signal) | 6 |
| audio mono out(return) | 15 |
| audio mic in left(signal) | 1 |
| audio mic in left(return) | 10 |
| audio mic in right(signal) | 7 |
| audio mic in right(return) | 17 |
| chassis gnd | 24 |
| NC | 9 |
| NC | 16 |
| NC | 18 |
| NC | 19 |
| NC | 20 |
| NC | 21 |
| NC | 22 |
| NC | 23 |
| NC | 25 |
| | 26 |

The connections for VGA are implementated in a 15 pin "D" connector and has the following pin assignments:

| Signal | Pin# |
|---|---|
| Red video | 1 |
| Green video | 2 |
| Blue video | 3 |
| NC | 4 |
| Digital return | 5 |

| | | |
|---|---|---|
| red return | | 6 |
| Green return | | 7 |
| Blue return | | 8 |
| NC | 9 | |
| Digital return | | 10 |
| NC | 11 | |
| NC | 12 | |
| H-sync | | 13 |
| V-sync | | 14 |
| NC | 15 | |

3.0 Network Video format Overview

The low speed (155.52 Mbs) Medianet connection is limited to 149.56 Mbs for data transport and any video format must be less than or equal to this value including ATM cell overhead. By using YUV 4:1:1 the network bandwidth requirements for uncompressed video transport will be as follows *:

| | |
|---|---|
| 720X590X25 (PAL) | 127.44 Mbs |
| 720X483X30 (NTSC) | 125.1936 Mbs |
| 352X288 (CIF) | 36.49536 Mbs |

*note: these values do not include the ATM cell overhead and are stripped of non displayed pixels.

The video data is stripped of samples that are not included in actual display of data and sync information is encoded by value. A byte that is equal to zero is a horizontal sync, two bytes of zero is a vertical sync, and three bytes is vertical sync/ frame tag. Immediately after detecting a frame tag, the following four bytes of the video data are the frame number which is used for generating an interrupt on value or else the count can be accessed at any time by the host bus. In addition, the frame number can be initialized to any value, be set to increment or decrement, and the interrupt can have different logical relationships. (<=, >=, =) The front and back porch timing is not transmitted and is reconstructed locally. The number of ATM cells that are sent per video frame are adjusted so they can distributed in a regular manner onto the IsoChannel. It is the function of an FPGA on the MNAV1mc to translate MediaNet data formats to and from conventional data forms.

APPENDIX C

1. The Emerging Multimedia Computing Environment

A few years ago, Alan Kay provided the author a tour of Xerox's Palo Alto Research Center. The things being done there with computers were a revelation. The interaction of 11-year olds with the computer was being studied by a psychologist; the children had designed their own icons for the graphics-oriented system they were working with. While Kay played Bach on an organ console, his program captured the music on a monitor screen. Kay edited this with a mouse, and the system played the new version back, complete with organ-pipe turnon transients. This computer and the others were tied together with a shared cable system, but almost as an afterthought: how people interacted with computers was more important than how computers interacted with each other.

By now the use of graphical interfaces with icons has become commonplace, as has interconnecting systems with Ethernet. The interface between the user and the computer has progressed from a one-dimensional folded character stream to a two-dimensional page or desktop metaphor. The use of local area networks has made it possible for small, cheap computers to take over much of the work of mainframes. These innovations arising from PARC and similar places have now been assimilated into the mainstream; Microsoft's Windows has moved from a clumsy imitation of the Macintosh to a must-have item for serious PC users. Where will our next revelations come from?

In answering that question, consider that we live in a 4-dimensional world, with time as the fourth dimension, and thus far only two spatial dimensions have been routinely used in computer interfaces. It now appears clear that the next major step forward is to make use of the time dimension. This means going from still frames to video and other moving images, and from simple beeps to audio capabilities rivaling Kay's work of the seventies.

The third space dimension will be honored mainly by being simulated in two dimensions for applications such as mechanical design. Computation may be done in three dimensions, but the human interaction will still assume a flat canvas. True three-dimensional output media, such as holograms, are still a large distance over the horizon.

In going to a computing environment that takes advantage of the time domain, the best description is multimedia. The demands of video and audio are substantially different from current data transfer applications and will require new hardware in three major areas:

On the desktop

The network

The multimedia server

A company that intends to work in multimedia computing must make sure that all three of these bases are covered, either itself or by partners it works with.

This situation is similar to the one that existed in the early fifties with color television. No one would want to buy a color set if there were no programs being broadcast in color, and no station would invest in color equipment without an audience to justify it. Fortunately RCA both manufactured sets and owned broadcasting stations; it subsidized both sides until the market reached a self-supporting size, at which point it had a substantial lead over its competitors.

Timing is also a critical element. There is little room for a startup if major firms already dominate the market, but success is equally elusive if one is too early. The fate of the early worm is well known.

1.1 CBM in the Emerging Market

CBM is addressing the three hardware areas mentioned above: the desktop, the network, and the server. It is positioned to achieve the necessary critical mass: in each of them it will have products that will work together well and also provide an open system in which users can attach other equipment and applications. Users now demand standards-based systems that will allow other vendors' machines to attach to the networks, and will permit a wide variety of applications to access the information coming in over the network.

The timing is right. Video compression technology is making rapid strides, leading edge applications are in sight, and multiservice networks are emerging from standards committees, with serious plans being made to implement them as public facilities. In order to get the users a little bit pregnant, Apple is now including a software-only video decompression program called Quicktime in the Mac operating system, and is encouraging the development of hardware enhancements for it.

Video compression until now has largely been a proprietary field, with users required to buy matched pairs of compression/decompression boxes from the same vendor. Now standards are catching up with the technology from several directions, and it is important to be able to claim standards compliance, although *which* standard is still a matter of choice-- JPEG (Joint Picture Editing Group), CCITT, or the de-facto Intel/IBM DVI (Digital Video Interactive) standard developed for games. A system that supports whatever the customer needs, or thinks he needs, is the right answer.

1.2 CBM Experience: the Berkom connection

The country that has been most agressive in pushing for high-speed public networking has been Germany. A number of trial networks operating up to 155 Mbps have been set up over the last few years. One such project, Berkom (for Berliner Kommunikationssystem), provided experience in high-speed networking for CBM's original parent, Condatec. This technology is now available to CBM.

For Berkom, Condatec developed components of a multimedia network: audio, video, and graphics boards for PCs, as well as network interfaces supporting early versions of Broadband ISDN at 139 and 153 Mbps. The experience gained by the Bundespost in operating a variety of applications and services over the trial network has provided CBM with insight into the potential of such systems. This insight goes well beyond that shown by most networking companies, small or large, and should be considered one of the firm's greatest strengths.

1.3 Product areas

This section will cover specific CBM products, with reference to the overall needs of the multimedia systems.

1.3.1 Desktop interfaces

Since there are several desktop families in common use, covering the market adequately involves providing boards for all of them. The PC, the Macintosh, and the Unix-based systems such as Sun will all have to be covered in order to provide for existing desktops. There are tens of millions of PC's and other desktop computers installed in this country. It would be totally impractical to require users to discard them in order to phase in new multimedia applications.

CBM has boards with common functionality designed for the most popular computer buses:

AT bus and MCA bus for IBM compatibles
    Nubus for Macintosh II
    S-bus for the Sun SPARC family.

These boards differ in their interface to the computer's system bus but otherwise provide common functionality and common types of connection to the network. Data passing from board to board, for example from the network board to the video board, bypasses the system bus and uses CBM's own Iso Channel.

This approach makes a great deal of sense. It offloads the computer's system bus, which might otherwise be totally clogged by the data volume required by full-motion video. It also provides additional commonality between the board designs used in the various hardware platforms, which otherwise differ in the way they transfer data over the system bus.

Software is a very tricky issue for networks whose operation affects all parts of the computer, with file tranfer, audio, and video being routed to the monitor. Particularly in the PC with DOS, the normal rigid boundaries between applications, operating system, and device drivers were never developed. As a result, applications have had to know far too much about the devices on the system. If one is to introduce a new device, it must somehow take advantage of standard APIs (Application Program Interfaces), since old programs have no way of accommodating new drivers.

Other operating systems, such as Unix or the Macintosh operating system, have more sophisticated facilities but nevertheless have quirks that are not easy to work around.

These problems have received a great deal of attention at CBM. Without the benefit of exhaustive experience, it would be difficult to say if all the potential problems have been solved, but it is clear that there is an adequate level of expertise to deal with any problems that could come up.

1.3.2 The server

Most companies interested in developing multimedia systems assume that the source of the information is somewhere else. Generating the video, performing the calculation for visualization, and sourcing complex audio signals are all someone else's problem. This is a bit like the sound of one hand clapping: interesting to contemplate, but difficult to find an application for. CBM, in contrast, has tacked the server problem and made the server central to its strategy.

The information volume that can be absorbed by video workstations is enormous. There is little likelihood that it will be possible to generate everything on the fly: data, video segments, and an enormous variety of material will need to be summoned up from storage media and sent via the network to the multimedia workstation.

The server needs a great deal of versatility in its architecture since the applications are quite varied and subject to change as more applications are conceived for multimedia systems. Examples of the storage media that users may need include:

laser video disc
    music CD
    CD ROM
    digital audio tape
    video tape (in a large variety of formats)
    conventional computer disc
    optical read/write disc
    paper document plus scanner as well as other high-volume sources such as video camera
    radar receiver
    instrument output CBM has recognized this issue in making the server central to the architecture. Its MDBS/1 provides a variety of inputs switchable to the network output. This system should be able to retain its flexibility and be able to handle new media as they come along.

1.3.3 Source Switching

With a wide variety of source media and multiple destinations, some sort of switching is required to get the data to the proper end point. CBM allows for this in having a central ATM switch at the heart of the network, in fact as an integral part of the multimedia server.

An ATM switch can in fact be a number of different things. The basic idea is simply that the unit of data switched is a fixed-length packet or "cell" in the telephone world. The multimedia capability of such switches follows from the fact that the small cells can be interleaved easily on any communication line ranging from voice-grade up to gigabits per second. This allows fixed- and variable-bandwidth services to coexist comfortably on the same network.

Any shared medium network or shared memory can act as a switch. Units of data (in this case cells) are brought in to memory from one port and and are read out to another. The shared medium network (which can include anything from a multidrop wide area network down to the backplane of a computer) accepts data from one node, addressed to another. Of these two methods, the shared memory is probably the easiest and cheapest to implement, although when the number of ports on the memory becomes high, access logic for the memory begins to look like a shared bus.

1.3.4 Premises distribution

The common denominator of all the options used by CBM in switching and distribution (both on the premises and off) is the use of ATM cells. Differing switch technologies can be used, and different collection and distribution networks can be installed, but the information source and destination can be insulated from the differences.

For example, the distribution of ATM cells on the premises can be either point-to-point or via an 802.6 network.

The cell formats for these two networks are very similar. For public networks, 802.6-based feeder networks will hand over their cells to ATM switches, which will be capable of handling very large volumes totaling hundreds of gigabits per second in the aggregate. In premises networks, this compatibility means that CBM will be able make use of both technologies.

The point-to-point network is relatively simple: for each fiber, one end transmits cells at will, and the other end receives them. The ultimate destination of each cell may actually be different, but the link has only two nodes and avoids the need for a medium-access protocol required with shared media such as Ethernet.

CBM has provided a cost-effective point-to-point network adapter in its BFA/1, which uses the cell formats emerging from the Broadband ISDN standardization effort. When B-ISDN is installed a public network, the BFA/1 will be usable for off-premises networking as well as on-premises.

The other alternative, the IEEE 802.6 protocol, was designed to support multimedia applications over distances of tens of miles, but it will work very well for premises applications. It is a shared-medium network with a medium-access protocol that is distance-insensitive compared to LANs. It also is cell-based, with a cell size and structure designed to be compatible with wide-area networks based on ATM switching.

The use of a shared network has its pros and cons relative to the ATM switch and dedicated links. The positive side is that a switch is not needed at all since the cells can be addressed directly to any destination on the network. Further, no single point of failure exists: if any node fails, the network automatically reconfigures itself.

The limitation is in the total throughput available. Chips will shortly appear on the market capable of running the protocol at a speed of 45 Mbps, but higher SONET speeds such as 155 and 622 Mbps are still a couple of years away. Since the 802.6 network is bidirectional, the 45 Mbps speed gives a total of 90 Mbps for all the users on the system, but that is not sufficient to support uncompressed video.

A compromise solution proposed by CBM makes sense. It involves using 802.6 as a multimedia network for modest size workgroups, with the groups interconnected via point-to-point links from a bridge to an ATM switch. The BFA/1-based link can run at high speed to retrieve data from the server or from the outside world, with distribution to the desktop via the shared-medium 802.6 network. This solution will work so long as the bandwidth demands are moderate: it has the advantage of sharing the medium among a number of workstations. Any workstation which requires continuously high rates, as for example, in uncompressed or lightly compressed video, can be connected directly to the switch.

1.3.5 Off-premises networking

Premises networking is of course only part of the requirement. High-speed networking facilities are now being planned by the telephone companies, with actual service beginning in 1992. The service is SMDS, which is based on the IEEE 802.6 standard with some simplifications and some additions. While the 802.6 technology is not efficient for users distributed uniformly over hundreds of miles, as employed by SMDS it will work very well.

SMDS will use 802.6 as the protocol between the customer premises and the central office. In order to provide privacy, the connection for a particular subscriber will not pass through anyone else's premises; multiple connections to the bus are permitted, but they will all be within the same customer's facilities. Connections between central offices may or may not use the 802.6 protocol (eventually they will be Broadband ISDN with large ATM switches) but the user will not be aware of the difference.

The additions made to the 802.6 standard include the screening of source and destination addresses and the incorporation of billing facilities. The capability of multiple premises connections at the T1 speed is not required, making the link in effect point-to-point. In this case the distributed queue protocol need not really be implemented, but the format of the fields in the cells sent down the line must be the same as when multiple connections share the bus.

SMDS currently provides only for data transmission, with a connectionless service consistent with that provided by LANs. This is not ideal for multiservice facilities, but the 802.6 protocol will accommodate the other services (drafts are being written now in the IEEE committee) and SMDS can be upgraded to handle them. There is a natural reluctance on the part of the telephone industry to compete with existing POTS for voice, but the economics indicate that carrying voice from premises to CO on the 802.6 link makes a lot of sense. If the RBOCs don't do it, the alternative carriers will.

Variable-bit-rate services, on the other hand are new and not cross-elastic with existing revenue sources. As a result, there should be little reluctance on the part of the carriers to adopt such features, provided existing equipment can be upgraded economically to support it.

*The keys to the adoption of SMDS are the provision of cost-effective tariffs, the availability of CPE facilities, and the installation of switches in a sufficient set of central offices.*

Present estimates are that Bell Atlantic will offer service late in 1991 to selected customers on a special-quote basis, with the tariffed service coming on-stream in the spring of 1992.

Pacific Bell will probably the second of the RBOCs to offer the service: their field trial started with Stanford University and wound up with a number of name Silicon Valley firms such as Apple and Hewlett-Packard.

1.3.5.1 Until SMDS arrives

While the telephone industry ramps up SMDS, other alternatives are available for the short run. These include the old standby of leased lines, an expensive solution if there are many sites to be interconnected, but reasonable if there are only a few. The jump in capacity between T1 at 1.544 Mbps and T3 at 44.7 Mbps is a very large one; however, fractional T3 may become available in some cases.

Another short-term solution is frame relay. Frame relay service is ramping up faster than SMDS, but it is limited to T1 speed. The usage-sensitive feature of frame relay is a big benefit for slower applications, but multiservice applications will be at the high end of the T1 range, not the low end. Eventually frame relay will migrate to T3, but SMDS may well arrive first and provide the general connectivity that frame relay, with its permanent virtual circuits, cannot match.

A dark horse for interconnecting multiservice sites is primary-rate ISDN. The acceptance of ISDN in the US has been so slow that it would be risky to count on basic-rate ISDN, let alone primary rate ISDN, in most parts of the country in the next few years. The market failures of ISDN have convinced most of the players to wait for a new roll of the dice – some looking at frame relay and some at SMDS.

2. Gating technologies

The advent of multservice networks will be the result of a number of technical factors, all of which seem to be at the right point either now or in the immediate future.

2.1 Video compression

The video compression business has accelerated rapidly in the last few years. Having lived for perhaps a decade on the long-distance video conferencing application, this industry has received a shot in the arm from the approach of HDTV. The desirability of having a digital TV system, coupled with the 30 MHz bandwidth of HDTV, has made compression a must if conventional 6 MHz channels are to be used. Also, the distribution of video entertainment over digital fiber lines also depends on the use of compression.

The result is that a variety of standards and approaches are reaching fruition in different areas. The JPEG (Joint Picture Editing Group) started from the point of encoding still frames, while the DVI consortium (principally Intel and IBM) started from video game technology. CCITT, representing the telephone industry, of course is doing its own thing.

Whichever approach becomes the most popular, the result is that the manufacturing volumes and integration in silicon will force prices down to a few hundred dollars per terminal within a few years. This will make it possible to run the desktop computer with video capability at a price that hundreds of thousands of users will sign up for over the decade.

2.2 High speed microprocessors

The horsepower race in microprocessors in no more than a year away from the 100 MIPS level, an astonishing level of power when compared with the original VAX at 1 MIPS, which was capable of supporting two dozen time sharing users.

If 1 MIPS can do a respectable job of word processing or running a spreadsheet, what can be done with 100 MIPS? Manipulation of pixels, video and audio synthesis, complex communication protocols, all can be done in the processor's spare time. Certainly attachment to a multiservice network will not result in the processor being swamped.

Concurrently, the speeds as well as the sizes of memory chips have been increasing. DRAMs, the main memory element in most desktop machines, are widely available under 60 nanoseconds cycle time, with 4 megabit capacity. Likewise, the SRAM chips used in the fastest memories or caches, have dropped substantially in price for a given speed. The result is that the cost of building memories for visually-oriented data is not an inhibiting factor.

2.3 Multiservice networks

The final enabling technology is in the networking area. The last decade has seen a strong march toward standards on the part of the user community, with the result that a nonstandard network is a very difficult sell. Users would prefer to wait for something that is at least plausibly a standard, even if it means delaying their implementation plans.

The key to providing networks that work well with different kinds of traffic is to divide the data streams into small segments or cells that can be readily intermixed. This has been the main consideration that has led the 802.6 metropolitan networking standard to the use of cells. For this reason and also because of the potential cost and speed advantages of ATM switches, the wide area networking world is also headed toward a cell orientation.

Taking the cell approach to the desktop then brings the multiservice advantage to the LAN user. In addition, it provides a consistent approach to networking, with essentially seamless boundaries between local, metropolitan/campus, and wide area networks. This latter advantage will make the cell-to-the-desktop approach advantageous even to the conventional data networking user, whose major application is simply the transfer of data files.

The result can be simplification of the networking process, where the incompatibilities of the various networking layers (TCP/IP, ISO, SNA, DECnet, etc) can be circumvented. The use of a global E.164 address with geographic significance (it is essentially a telephone number) will bring to computer networking the advantages that the telephone industry has had in country codes, area codes, etc., and the post office has had in zip codes. No switch will have to know much more than its immediate environment to be able to route data worldwide.

The 802.6 protocol has been designed to handle connectionless data, isochronous traffic (fixed bit rate), and variable bit rate traffic consistent with the needs of compressed video. In order to meet the time constraints of the SMDS introduction, the 802.6 standard was issued with coverage only for connectionless data. All other items were left for the future; work is now under way on them.

The remaining two services are now being finished. Most of the significant decisions in the isochronous case have been made: the cells will be dedicated to a single connection rather than being shared between many connections, as originally envisioned. Such cells will be directly compatible with ATM switching. The mechanism for supporting the generation of cells at a variety of fixed bit rates has been largely defined: the only complication is the transport of 1.544 Mbps T1 traffic, which does not fit the pattern of N x 64 kilobits per second.

The mechanism for supporting variable bit rate service has been proposed and refined several times. It is likely that all the significant decisions will be made within the next four months.

The result of this schedule is that it will be possible to start immediately on the development of hardware that implements all the 802.6 services. If some changes are made as the standard goes through the approval process, the designs can be updated before final commitment to production silicon.

In the short run, the lack of high-speed 802.6 or ATM-oriented silicon can present a problem. At T1 speed, there is no need to go to a VLSI implementation: FPGA chips programmed in-house are the solution being adopted in most places. The key to cost-effective implementation at higher speeds is the availability of commercial chips. Small 802.6 networks have been built without VLSI, but the costs will deter widespread implementation. Chips running at 45 Mbps will be available in 1992, but it is not clear whether sufficient features will be available. Custom ASICs are probably the best answer: new tools make this an increasingly viable option for modest production runs.

3. Competing technologies

The idea of a distributed, video-oriented computer system is a new one in the market, but one that appears inevitable due to the convergence of the various technical and market forces mentioned earlier.

The three components, source, networking, and desktop, must all be handled skilfully and cost-effectively for the company to succeed. If any one is perceived as inadequate, the other two will fail to sell also. Therefore we need to review the other alternatives, the roads not taken, to be assured that the marketplace will not go in another direction. Or if it might do so, we should be assured that product changes are feasible.

The computing scene in all respects is sufficiently complicated that there is a great benefit for people to do the same thing as their neighbors are doing, even if they are not networked together. The comfort level associated with being able to compare notes with someone else drives customers to opt for the same thing that is already in common use, if it will serve their needs. For this reason it is very hard for a new product, even if full of new features, to achieve dominance if an existing product is most people's default choice. The success of Microsoft DOS, Lotus 1-2-3, or the HP laser printers are cases in point.

In new areas, however, there is no default choice, and the field is open to new players. Skill in picking the right technical choices, and enough elbow room to do midcourse corrections, make the difference between the startup that succeeds and the one that fails.

3.1 Desktop alternatives

The variables at this point on the product spectrum are mainly the platforms supported and the type of video compression used. By supporting most of the common desktop machines, including the AT bus and the MCA bus for the PC, the Nubus for the Mac, and S-bus for Sun SPARC, most of the important machines are covered.

Adding support for another make of computer would not be a difficult operation: simply adapting the existing logic to a different system bus, but keeping the Iso Channel and the external connection the same.

The evolution of the video compression technology is likely to continue for some time. The various standards may coalesce in time, but the technology is sufficiently immature that new methods may arrive on the scene at any time. The only way to handle this will be to redesign the video compression/decompression section of the board, but preserving the external connections to the network, the system bus, and the Iso Channel.

3.2 Server alternatives

This situation is perhaps the easiest of the three in terms of the upgrade or redirection issues concerned. Once the architecture of the server is established, addressing new media is a matter of designing new boards to accommodate the hardware. The physical drive hardware to support new media will come from outside sources, and the development required is to adapt the data format native to that medium to the networking requirements of the CBM system. For example, a read/write laser disc player might require a new adapter board utilizing components from a read-only laser disc board. Partnership relations with companies promoting new media will clearly be a possiblity.

3.3 Networking alternatives

This is the most critical area. Users will not install a multiplicity of networks to serve different applications. They need to feel confident that they will be able to attach the equipment from a variety of vendors to their network, and hence insist on standards-based nets. The network technology of choice must both meet the needs defined by the application (which a proprietary design could do also) and also have broad acceptance in the field.

High speed networks are relatively new, but there do exist a number of alternatives to be examined as possible paths.

3.3.1 FDDI

FDDI has been designed as a data network, specifically as a primary network rather than as a backbone. It provides packet transport at 100 megabits per second with a protocol taken from the IEEE 802.5 token-passing ring. It has made a few changes: one for the better is reclocking at each node, which avoids the jitter problems currently plaguing large token ring installations. As a backbone rather than primary network, FDDI has problems with transparent bridging because of ring stripping and acknowledgment bit issues. Some vendors (such as Motorola and National) have diverged from the standard in these areas.

However, FDDI has not been designed to handle any traffic other than packet data from computers. For large networks the latency problem is an issue: even if the load is light, one must wait until the token arrives before initiating transmission. Sending video over FDDI would subject it to uncertain delays, very likely exceeding the requirements of adequate picture quality. The same issue also affects voice and high-quality audio, which is in fact less tolerant of transmission glitches than video.

On the positive side, FDDI has been espoused fully by the computer industry, and there is no shortage of network products that use it.

3.3.2 FDDI-II

FDDI-II is the FDDI world's attempt at a multiservice network, one that has shown no signs of success yet. It has the fatal flaw of being incompatible with FDDI; the two versions cannot share the same fiber. As a result, FDDI's success mitigates against the adoption of FDDI-II.

The multiservice capability of FDDI-II is limited. It provides isochronous channels of 6 Mbps (up to 16 of them), which must be subdivided externally for applications such as voice that work in terms of smaller channels. No variable bit rate capability other than the connectionless packets is available.

While the situation may eventually change, the adoption of FDDI-II is currently close to nil. Some silicon vendors are leaving hooks for it in their newer chips, but the market demand has yet to materialize. (In fact, the FDDI demand has not reached expecations, as the problems of vendors like In-Net demonstrate.)

3.3.3 Frame relay

Frame relay has achieved a great success within the past year, at least as far as publicity is concerned. In a sense it is ISDN in disguise, with the LAP-D packet format slightly modified. It has the advantage in the internetworking field of requiring no hardware changes, unlike SMDS. This makes it an excellent target of opportunity for private network suppliers and vendors like Northern Telecom, whose SL-100 switches can support it.

Like FDDI, frame relay is designed to support data only. Currently it is limited to 2 megabits per second by the standards, and to permanent virtual circuits by all the current implementations, but it is possible that these factors may change.

The major weakness long-term is that frame relay is not strategic for the carriers. They seem to be unanimous in the view that a cell-based strategy holds the best long-term prospects for them. Despite the recent publicity for frame relay, they do not have the money to support two new generations of switching equipment. If they support frame relay, most of them will do it by converting to cells transmitted over SMDS or Broadband ISDN.

3.3.4 Circuit switching

Like neo-Victorian architecture, something we had bid goodbye to is back. For gigabit streams, it makes some sense. The limit to network speeds in such cases is the protocol processing, and with circuit switching there is less protocol processing per megabyte of data transmitted than there is with packet switching (such as frame relay) or cell switching (such as 802.6 or ATM). Therefore for the very highest rates, cell switching may be the method of choice, as in doing a brain dump of a Cray.

But the playing field is leveled somewhat by the breakthroughs represented by banyan switches. When they come into widespread use, they will be able to handle multiple gigabit streams, although the costs will be prohibitive for most premises installations.

3.3.5 IEEE 802.9

The 802.9 committee is the PBX manufacturers' toehold in the 802 standards structure. Its charter is to provide integrated voice and data access to a LAN. The committee started by reinventing ISDN at 4 megabits instead of 1.5; the results in the marketplace will be predictable.

As an encore, they are working on a "high-speed" version that will run over twisted pair from a desktop to a concentrator at 20 megabits per second. This represents the upper speed boundary of IEEE Project 802's charter (the 802.6 MAN group got an exemption), but in the face of 100-megabit FDDI over twisted pair, it is not likely to turn many heads.

For several years, the 802.6 committee has been proposing that 802.9 work on a compatible system, with the cells from an 802.6 backbone going over twisted pair to the desktop, but so far to no avail.

3.3.6 Experimental systems

Often technology is developed and publicized in research laboratories, but is never actively pushed as a commercial offering. A recent case in point is the H-bus developed at Bellcore for the customer-premises end of a Broadband ISDN link.

This design, like a large number of others done in Bellcore and Bell Laboratories, is a demonstration item. Bellcore in fact feeds technology to the telephone industry through standards organizations; its work in SMDS/IEEE 802.6 and Broadband ISDN are cases in point. Other items of proprietary technology could presumably be licensed by third parties and manufactured, but there is no history of this having happened in the network field.

4.0 Summary

The computer industry is now on the verge of a major change in the human-computer interaction: the incorporation of moving images into the desktop machine.

This movement is far enough along that we can say with confidence that it is occurring, but new enough to be wide open in terms of market opportunity. The critical technologies are sufficiently well developed to support viable applications.

CBM is addressing the three key elements in video-based distributed computing: the desktop, the network, and the server. Its current plans show it has the vision to understand the opportunity that currently exists for a comprehensive set of products.

The underlying technologies that are required for the implementation of multimedia networks are well understood. Components are available now, with the exception of high-speed implementations of 802.6 and perhaps the more advanced video compression algorithms. However these items are not required immediately; they should be available in ample time for CBM's plans.

From a technology standpoint, CBM's architecture and implementation decisions have been both forward-looking and well thought out. They should have a very successful future.

We claim:

1. A multimedia network system for operation in conjunction with a data network and a computer having a video board which is connected to the system bus of the computer and which is further connected to an audio/video device, comprising:
   a high speed data bus;
   a network interface board connected to the high speed data bus and further connected to a system bus of the computer and further connected to the data network; wherein
   said video board is connected to the high speed data bus; and
   said network interface board receives a plurality of data cells from the data network, formats said data cells into asynchronous signals and synchronous signals, routes said asynchronous signals within the data cells to the computer and further routes said synchronous signals to the high speed data bus.

2. The multimedia network system of claim 1, wherein:
   the video board converts information received on said high speed data bus into conventional audio/video signals to an audio/video output device.

3. The multimedia network system of claim 2, wherein:
   the video board further accepts signals from an audio/video input device, converts the signals from the audio/video input device into a form acceptable by said high speed data bus, and puts those signals on the high speed data bus.

4. The multimedia network system of claim 3, wherein:
   said network interface board formats signals received from said high speed data bus into asynchronous transfer mode (ATM) cells and further transmits those ATM cells onto the data network.

5. The multimedia network system of claim 4, wherein:
   said network interface board further formats asynchronous signals received from the computer into ATM cells ad further transmits those ATM cells onto the data network.

6. The multimedia network system of claim 1, wherein:
   the data network is a broadband integrated signal and data (BISDN) network.

7. A data communications device, connected to a computer which has an audio/video unit and which is connected to a local area network, the data communications device comprising:
   a network interface unit for receiving data cells from a network and formatting said data cells for use by the computer, and for formatting data from said computer into said data cells and transmitting said data cells to the network; and
   a high speed data bus interconnecting said network interface unit and said audio/video unit of the computer, for transmitting signals between said network interface unit and said audio/video unit of the computer; wherein
   the network interface unit is connected to the computer such that data cells containing asynchronous data are transmitted to the computer for use therein and for distribution to the local area network.

8. The data communications device of claim 7, wherein:
   signals are received at the data communications device as optical signals and are converted therein into electrical signals; and
   signals to be transmitted from the data communications device are converted from electrical signals into optical signals for transmission via a fiber optic transmission means.

9. The data communications device of claim 7, wherein:
   data arrives at the data communications device in the form of asynchronous transfer mode (ATM) cells;
   the ATM cells are reformatted, as appropriate, within the data communications device into synchronous and asynchronous signals and both the synchronous and asynchronous signals are provided to a data bus such that asynchronous signals are received from the data bus into a packet memory for use in the manner conventional to the particular type of asynchronous signals.

10. The data communications device of claim 9, wherein:
    the audio/video unit receives synchronous data from said network interface unit and converts the synchronous data into audio and video outputs.

11. The data communications device of claim 10, wherein:
    the audio/video unit further receives audio and video inputs and converts the audio and video inputs in form for transmission to said network interface unit.

12. A method for processing data contained in asynchronous transfer mode (ATM) cell format, in a computer having a network interface unit, comprising:
    receiving the ATM cells and converting them into electrical signals;
    reformatting the data into synchronous and asynchronous formats as is appropriate to the particular data, within said network interface unit;
    providing asynchronous data to a data bus in the computer; and
    transmitting synchronous data via a high speed bus to a video processing means, for converting the synchronous data into video and audio outputs.

13. The method of claim 12, wherein:
    asynchronous data is provided from the data bus to a packet memory for processing as appropriate to the particular packet format of the asynchronous data.

* * * * *